United States Patent [19]

Sotoyama et al.

[11] Patent Number: 5,612,449
[45] Date of Patent: Mar. 18, 1997

[54] NONLINEAR OPTICAL MATERIAL, PROCESS OF PRODUCTION OF SAME, AND NONLINEAR OPTICAL DEVICE AND DIRECTIONAL COUPLING TYPE OPTICAL SWITCH USING SAME

[75] Inventors: Wataru Sotoyama; Satoshi Tatsuura; Tetsuzo Yoshimura; Azuma Matsuura; Tomoaki Hayano, all of Kawasaki, Japan

[73] Assignee: Fujitsu Limited, Kawasaki, Japan

[21] Appl. No.: 462,597

[22] Filed: Jun. 5, 1995

Related U.S. Application Data

[62] Division of Ser. No. 88,649, Jul. 9, 1993, Pat. No. 5,459,232.

[30] Foreign Application Priority Data

Jul. 13, 1992 [JP] Japan .................................. 4-184895
Jun. 25, 1993 [JP] Japan .................................. 5-155418

[51] Int. Cl.$^6$ ........................................... C08G 73/00
[52] U.S. Cl. ...................... 528/345; 528/330; 528/331; 528/347; 528/348; 528/327
[58] Field of Search ........................... 528/422, 330, 528/327, 345, 347, 331, 348

[56] References Cited

U.S. PATENT DOCUMENTS

| | | | |
|---|---|---|---|
| 4,694,066 | 9/1987 | DeMartino et al. | 528/373 |
| 4,808,332 | 2/1989 | DeMartino et al. | 526/312 |
| 4,913,844 | 4/1990 | DeMartino et al. | 526/265 |
| 4,994,209 | 2/1991 | Okazaki | 252/301.35 |
| 5,189,134 | 2/1993 | Mignani et al. | 528/363 |
| 5,194,548 | 3/1993 | Yoshimura | 526/285 |
| 5,212,269 | 5/1993 | Fischer et al. | 528/327 |
| 5,256,784 | 10/1993 | Francis et al. | 544/294 |

OTHER PUBLICATIONS

"Thermal Stability of electro–optic response in poled polyimide systems"; Appl. Phys. Lett. 58(3), Jan. 21, 1991.

"Benezocyclobutene Interlayer Dielectrics for Thin Film Multiship Modules"; IEEE Transactions on Components Hybrids, and Manufacturing Technology vol. 13, No. 2, Jun. 1990.

CA 119(14): 149198d, Oct. 4, 1993 "Preparation of 4,4'-diaminotriphenylamine derivatives as intermediates for nonlinear optical materials and functional dyes", Aramaki.

*Primary Examiner*—Morton Foelak
*Assistant Examiner*—P. Hampton-Hightower
*Attorney, Agent, or Firm*—Armstrong, Westerman, Hattori, McLeland, & Naughton

[57] ABSTRACT

A nonlinear optical material composed of a polyimide obtained from a diamine and/or a diacid anhydride or dithioacid anhydride substituted by a portion having a nonlinear optical effect or of molecules having a benzocyclobutene structure substituted at the portions having an nonlinear linear optical effect.

4 Claims, 9 Drawing Sheets

COUPLING LENGTH
$\pi / 2\kappa$

CHANGE IN INDEX
OF REFRACTION
$K \rightarrow K'$

|  | 9.3g | 92.0g | 42.4g |
|---|---|---|---|
|  | (0.10mol) | (0.40mol) | (0.40mol) |

(1) ADDITION OF 4-NITROPHENETHYL BROMIDE

4-NECKED FLASK NITROGEN EXCHANGE

150°C, 9hr

WASH SOLID WITH WATER AND METHANOL

DRY, THEN WEIGH 20.9g(53%)

└─ 19.55g (0.05mol)

500ml 4-NECKED FLASK NITROGEN EXCHANGE
 ┌─ Sn 23.7g (0.20mol)
 ├─ concHCl 90g
 └─ EtOH 50g (2) AMINATION BY REDUCTION OF NITRO GROUP REFLUX UNDER HEATING 4hr

REMOVAL OF ETHANOL BY EVAPORATOR

REMOVAL OF SOLID (Sn)

┌─ pH>14 WITH NaOH
 └─ FORMATION OF PRECIPITATE

FILTRATION OF PRECIPITATE

WASH PRECIPITATE WITH MIBK, TOTAL 1000ml

WASHED LIQUID

300ml KOLBEN FLASK

DISTILL OFF MIBK, MEASURE IR SPECTRUM (Fig. 9)

└─ concHCl 10g/H₂O 80g (3) ACETYLATION OF AMINO GROUP

WASHING WITH MIBK
HCL SOLUTION BROWN → PALE YELLOW

FROM Fig. 4

- $(CH_3CO)_2O$ 12.0g(0.12mol)
- $CH_3COONa$ 10.0g(0.12mol)

FORMATION OF PRECIPITATE

- pH>7 WITH NaOH

FILTER OUT PRECIPITATE, WASH WITH WATER, THEN WASH WITH ETHER DRY THEN WEIGH. 4.24g(21%) TWO TLC SPOTS 4.15g (0.01mol)

(4) DIAZO COUPLING $O_2N$-〈〉-$NH_2$
2.76g(0.02mol)

- concHCl 9g/$H_2O$ 9g
- $NaNO_2$ 1.38g(0.02mol)/$H_2O$ 10g

ICE BATH, 0°C

500ml CONICAL FLASK

- ACETONE 40g/WATER 40g
- $N(Et)_3$ 10g
- $CH_3COOH$ 6g

ICE BATH, 0°C

DROPWISE ADDITION

FORMATION OF RED DYE

- pH>7 WITH NaOH
  FORMATION OF PRECIPITATE

FILTER OUT PRECIPITATE AND WASH WITH WATER DRY, THEN WEIGH, 5.2g(92%) TWO TLC SPOTS (5) HYDROLYSIS OF AMINO GROUP

500ml 4-NECKED FLASK NITROGEN EXCHANGE

- EtOH 100g
- concHCl 100g

REFLUX UNDER HEATING 2.5hr

- pH>7 WITH NaOH
  FORMATION OF PRECIPITATION

FORMATION OF PRECIPITATE FILTER OUT PRECIPITATE AND WASH DRY, THEN WEIGH, 3.9g(87%)

DIRECTION OF POLING

POLYIMIDE FROM COMPOUND(X) AND COMPOUND(XI)

SiO2

SiO2

SiO2

POLYIMIDE FROM COMPOUND(X) AND COMPOUND(XI)

NONLINEAR OPTICAL MATERIAL, PROCESS OF PRODUCTION OF SAME, AND NONLINEAR OPTICAL DEVICE AND DIRECTIONAL COUPLING TYPE OPTICAL SWITCH USING SAME

This is a division of application Ser. No. 08/088,649 filed Jul. 9, 1993, now U.S. Pat. No. 5,459,232.

BACKGROUND OF THE INVENTION

1. Field of the Invention

The present invention relates to a nonlinear optical material, a process for production of the same, and a nonlinear optical device and a directional coupling type optical switch using the same.

2. Description of the Related Art

In optical data processing equipment for optical exchanges, optical computers, optical interconnections, and the like, optical switches which exchange the light among waveguides by electrical signals are indispensable. As the basic form of an optical switch, the directional coupler shown in FIG. 1 for example is known. When two waveguides 1 and 1' are made to approach each other to about a wavelength of light 2, transfer of optical power occurs between the waveguides at a certain coupling length. A directional coupling type optical switch is one which controls the transfer of the optical power by causing the index of refraction of the coupling portion to change by, for example, the electro-optic effect.

The conventional directional coupler had been comprised between two waveguides on a plane, but we newly proposed a multilayer type directional coupler obtained by superposing layers of waveguides and constituting directional couplers between those layers (see Japanese Patent Application No. 4-48961). Using this multilayer directional coupler, it becomes possible to achieve a high degree of integration of the optical circuits.

The distance over which the transfer of light occurs (i.e., coupling length) is determined by the thickness and index of refraction of the core and cladding layers of the waveguides. When fabricating a directional coupler, it is necessary to bring the waveguides close to each other by exactly the distance suitable for the coupling length. In a conventional planar type directional coupler, it had been easy to bring the waveguides into close proximity by exactly the necessary distance, but a suitable technique for a multilayer type directional coupler as we had newly proposed had not been conventionally known.

Figure 1:
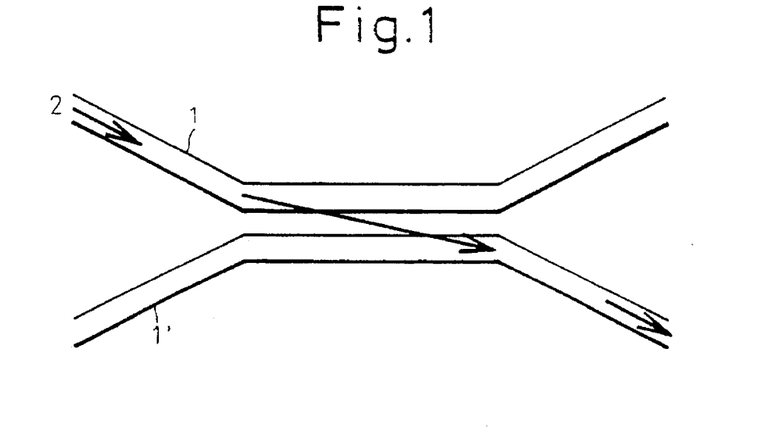
FIG. 1 is a view schematically showing the structure of a directional coupler.

At the time of fabricating the directional coupler, it is necessary to bring the two waveguides 1 and 1' close together as shown in, for example, FIG. 1, by exactly the interval suitable for the coupling length. In the conventional planar type directional coupler, it had been easy to bring the waveguides close to each other by exactly the necessary interval, but in the multilayer type directional coupler we newly proposed, there had been no suitable technique for this.

In the case of constituting a directional coupler, the coupling constant ($\kappa$) between waveguides and the difference ($\beta$) between the propagation constants ($\delta$) of the two waveguides become important (for example, Yariv. Introduction to Optical Electronics, 3rd edition, published in Japan as Hikari Erekutoronikusu no Kiso, 3rd edition (Maruzen), Chapter 13). The length (i.e., coupling length) of a directional coupler is expressed as $\pi/2\kappa$, while the maximum value of the transfer of optical power at the time of insertion of light into a waveguide is expressed by $\kappa^2/(\kappa^2+\delta^2)$. That is, for use as a directional coupler, it is necessary that $\kappa$ be sufficiently larger than $\delta$.

The conventional optical coupler had been fabricated by formation of waveguides on a substrate of an electro-optic material such as $LiNbO_3$ by, for example, diffusion of Ti (for example, see Nishihara, Haruna, and Suhara, Optical Integrated Circuits (Ohm Co.), Chapter 10). At this time, while the electrode structures differ depending on the optical axes of the crystal, basically in the state with no electric field applied, the propagation constants are equal ($\delta=0$). In two waveguides between which transfer of light occurs, by applying voltage (i.e., giving a difference in index of refraction to the two waveguides) so as to give a difference to the propagation constants, the movement of light is suppressed and switching is performed.

When it was attempted to apply this method to a multilayer type directional coupler using a conventional polymer electro-optic material, however, difficulties occurred. In a polymer electro-optic material, for example, an electric field orientation treatment is performed to impart nonlinear optical characteristics, but the electrodes used for the electric field orientation treatment are used as they are as the electrodes for bringing out the electro-optic effect. In this case, the change in the index of refraction due to the electro-optic effect becomes substantially equal for all layers and it is not possible to give a difference in propagation constants to two waveguides by applying voltage. Further, even in the case of using the third-order nonlinear optical effect or the thermo-optic effect, in a multilayer type directional coupler, it is difficult to change the index of refraction for just one waveguide.

A secondary nonlinear optical material, however, is only realized by a substance which does not have inverted symmetry, and therefore, the polymer has to be subjected to a poling treatment to orient the molecules in one direction. Such molecularly oriented polymers, however, have the defects of a gradual weakening of the orientation and a smaller nonlinear effect due to the heat motion of the molecular chains. To prevent this relaxation of orientation, it is effective to use a polymer with a high glass transition temperature. Use of a polyimide, which is a polymer with a high heat resistance, is being looked at. From this viewpoint, Wu et al. of Lockheed have obtained a diffusion type nonlinear optical polymer using a polyimide as a host by mixing molecules with a large nonlinear optical effect into polyamic acid and performing polyimidization while performing a poling treatment (J. W. Wu et al., Appl. Phys. Lett. 58. 225 (1991)). This material does not exhibit attenuation of the nonlinear optical response (i.e., electro-optic effect: EO effect) due to the relaxation of orientation even in the face of heat treatment of 150° C. for 10 hours or more, but the EO coefficient is a few pm/V (EO coefficient of $LiNbO_3$ is 30 pm/V), and therefore, the material is not practical. The EO coefficient is small in this material probably because the concentration of the guest nonlinear optical molecules in the diffusion type material cannot be made that large.

SUMMARY OF THE INVENTION

Accordingly, the object of the present invention is to provide a polymer nonlinear material with a large nonlinear optical effect and a superior heat resistance.

Another object of the present invention is to overcome the above-mentioned problems in the prior art and to provide a directional optical coupler or directional coupling type optical switch, which can be used even in a multilayer type waveguide having two or more waveguide layers on a substrate.

Other objects and advantages of the present invention will be apparent from the following description.

In accordance with the present invention, there is provided a nonlinear optical material comprising a polyimide obtained from a diamine and/or a diacid anhydride or dithioacid anhydride substituted at a portion having a nonlinear optical effect.

As the diamine, preferably, a compound having the structure of the formula (I):

wherein $m_1$ is an integer of zero or more, preferably from 1 to 3 and $n_1$ is, independently, an integer of zero or more, preferably from 1 to 4, may be mentioned.

As the diacid anhydride, preferably a compound having the structure of the formula (II):

wherein $m_2$ is an integer of zero or more, preferably from 1 to 3 and $n_2$ is, independently, an integer of zero or more, preferably from 1 to 4, may be mentioned.

As the dithioacid anhydride, preferably a compound having the structure of the formula (III):

wherein $m_3$ is an integer of zero or more, preferably from 1 to 3 and $n_3$ is, independently, an integer of zero or more, preferably from 1 to 4, may be mentioned.

In accordance with the present invention, there is also provided a process for producing a nonlinear optical material composed of a polyimide obtained by the steps of: causing a reaction between a diamine and a diacid anhydride to obtain a polyamic acid, applying the polyamic acid to a substrate to form a coating, then heating the coating, while applying an electric field thereto.

In accordance with the present invention, there is still further provided a process for producing a nonlinear optical material composed of a polyimide obtained by causing a diamine and a diacid anhydride or a dithioacid anhydride to sublimate, vapor deposit, and polymerize on a substrate in a chamber to obtain a polyamic acid and heating the polyamic acid, while applying an electric field.

In accordance with the present invention, there is still further provided a process for producing a nonlinear optical material composed of a polyimide obtained by causing a diamine and a diacid anhydride or a dithioacid anhydride to sublimate, vapor deposit, and polymerize on a substrate in a chamber in the presence of an electric field to obtain a polyamic acid and then heating the polyamic acid, while applying an electric field thereto.

In accordance with the present invention, there is still further provided a polymeric nonlinear optical material of the formula (IV) obtained from molecules having a benzocyclobutene structure substituted at the portion having a nonlinear optical effect:

(IV)

wherein Z is a portion having a nonlinear optical effect and $n_4$ is an integer of 2 or more, preferably from 5 to 5000.

As the portion Z having the nonlinear optical effect in formula (IV), preferably mention may be made of a residual group having a bond at at least one type of benzene ring selected from the azobenzene structure of formula (V), the stilbene structure of formula (VI), the tolan structure of formula (VII), and the diacetylene structure of formula (VIII).

wherein D is a donor group and A is an acceptor group.

In the above-mentioned formulas (V) to (VIII), preferably the said donor group D is —$NR^1R^2$, wherein, $R^1$ and $R^2$ are, independently, a hydrogen atom or a straight chain or branched chain alkyl group having one to 4 carbon atoms and said acceptor group A is a —$NO_2$, —CN, or dicyanovinyl group.

In accordance with the present invention, there is further provided a process for producing a polymer nonlinear optical material of the formula (IV) comprising ring-opening polymerization of monomer molecules having a benzocyclobutene structure of formula (IX):

(IX)

wherein Z is a portion having a nonlinear optical effect.

The polymeric nonlinear optical material mentioned above may be produced by causing the monomer molecules having the benzocyclobutene structure of formula (IX) to sublimate, vapor deposit, and polymerize on a substrate in a chamber to form a coating.

In accordance with the present invention, there is still further provided a directional coupling type optical switch which causes the reflection of the core portions or cladding portions of two waveguides in proximity with each other to change by the electro-optic effect, the third-order nonlinear optical effect, or the thermo-optic effect using the above-mentioned polymer nonlinear optical materials and causes the coupling constant between the waveguides to change.

Figures 2A, 2B:
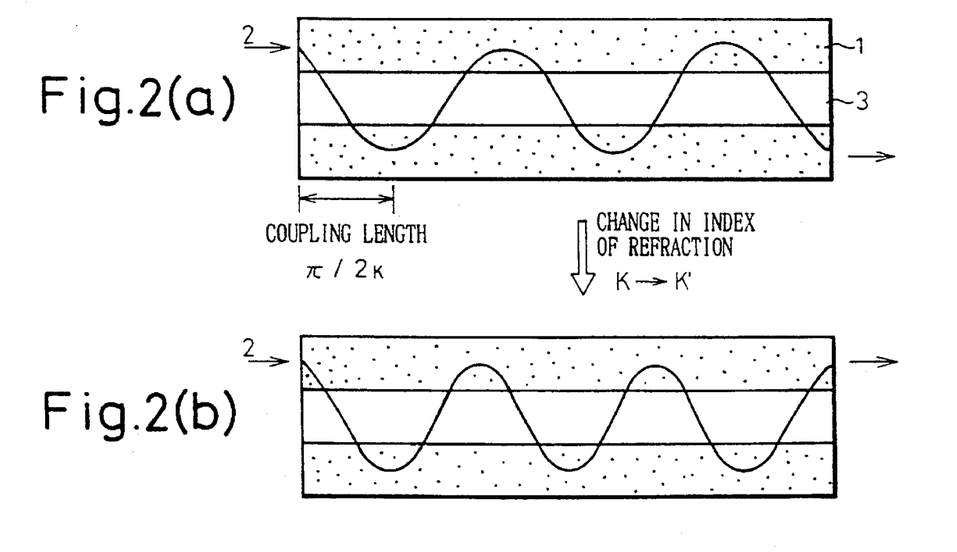

It should be noted that here, when the indexes of refraction of the core or intermediate cladding portions of the two waveguides are made to change by, for example, the electro-optic effect, the coupling constant κ between waveguides changes. When the coupling length π/2κ is halved by changing the κ, that is, when κ is doubled, switching of the waveguide light becomes possible. In actuality, it is difficult to realize enough of a change of the index of refraction so that the κ doubles by, for example, the electro-optic effect. Therefore, the device length of the directional coupler is made (2n+1) times the coupling length so that multiperiodic transfer will occur in the device (see FIG. 2). In such a construction, by making the coupling length n/(n+1) times by changing the index of refraction of the core or intermediate cladding layer, that is, by making κ(n+1)/n times, it is possible to perform optical switching. The magnitude of κ changes tremendously with widths of the cores and intermediate claddings of the two waveguides. In a multilayer type directional coupler, it is easy to control the core thickness or the cladding thickness on the submicron order by, for example, spin coating or vapor deposition, and therefore, it is possible to optimize the magnitude of κ and make the device length a practical length (e.g., several cm or less). A directional coupling type optical switch, based on the above principle, may be a planar type as well.

In accordance with the present invention, there is further provided a directional coupler, for a multilayer type waveguide having two or more layers of waveguides on a substrate, formed between two waveguides by making the thickness of the intermediate cladding layer small in the coupling region and large in the noncoupling region.

The coupling region of the multilayer type directional coupler may be set by changing the thickness of the intermediate cladding layer between the two waveguides. Therefore, the intermediate cladding layer is formed in two stages by vapor deposition of a dielectric or spin-coating, dip-coating, a doctor blade, or other wet process. At this time, it is also possible to successively change the thickness of the intermediate cladding layer to prevent loss of light due to bends or curves in the waveguides. Also, the order of the two stages of processes in the formation of the layer may be reversed. As the material for forming the intermediate cladding layer, use may be made of an inorganic substance such as $SiO_2$, an organic polymer obtained by, for example, vapor deposition and polymerization.

In accordance with the present invention, there is further provided a directional coupler, for a multilayer type waveguide having two or more layers of waveguides on a substrate, formed between two waveguides by making the index of refraction large in the coupling region and small in the noncoupling region.

The coupling interval of the above-mentioned multilayer type directional coupler may be set by changing the index of refraction of the intermediate cladding layer between two waveguides. Toward this end, the intermediate cladding layer is formed in two stages by vapor deposition of a dielectric using two types of masks. Further, it is possible to form the intermediate cladding layer as a uniform film including a photosensitive dyestuff, then irradiate light through a mask to change the index of refraction between the coupling region and noncoupling region. As the material and method of fabrication of the cladding layer, mention may be made of vapor deposition of an inorganic dielectric, spin-coating, dip-coating, or vapor deposition and polymerization of an organic polymer.

BRIEF DESCRIPTION OF THE DRAWINGS

The present invention will be better understood from the description set forth below with reference to the accompanying drawings, wherein:

FIGS. 2(a) and (b) are views showing the state of progression of a light beam in a directional coupler of the present invention, in which the index of refraction of the core or cladding portions has been changed;

DESCRIPTION OF THE PREFERRED EMBODIMENTS

The first polymeric nonlinear material according to the present invention is a side chain type polyimide nonlinear optical material, which incorporates nonlinear optical molecules into the side chain of the polyimide molecular chain. In this way, by causing coupling of a polyimide and nonlinear optical molecules, even when the concentration of the nonlinear optical molecules is made large, there is no precipitation of the molecules as crystals, and therefore, it is possible to make the concentration of the nonlinear optical molecules large and increase the nonlinear optical effect of the material. Further, in a side chain type polyimide, the motion of the molecules is restricted, and therefore, a heat resistance even better than a diffusion type polyimide can be expected.

To prepare this side chain type polyimide nonlinear optical material, a diamine or diacid anhydride having a large nonlinear optical effect is necessary, but such a substance currently is not available. Therefore, we developed a method of synthesis making an azo dye with a large nonlinear optical effect a diamine without impairing the nonlinear optical characteristics.

According to the present invention, to obtain a thin film of a polyimide, there are, for example, the method of mixing a diamine and a diacid anhydride, dissolving the resultant polyamic acid in a solvent, then using spin-coating or another wet process to form a film, then heating for removal of the solvent, dehydration and cyclization and the method of forming a polyamic acid thin film from a diamine and a diacid anhydride or dithioacid anhydride by vapor polymerization, then heating for dehydration and cyclization.

The second polymeric nonlinear material according to the present invention is a nonlinear optical material using a polymer obtained by polymerization of benzocyclobutene. In this way, it is considered that a polymer obtained by polymerization of benzocyclobutene can suppress the deterioration of characteristics due to relaxation of the orientation since it has a glass transition temperature of at least 200° C. and a high heat resistance.

The monomer serving as the raw material of the polymer is comprised of a portion for expressing the nonlinear optical effect and the benzocyclobutene portion for the polymerization reaction. As the nonlinear optical portion, azobenzene, stilbene, tolane, diacetylene, etc., which can exhibit a great effect as a nonlinear optical portion are suitable.

The directional coupling type optical switch according to the present invention constitutes a directional coupler wherein multiperiodic transfer of light occurs due to the fabrication of, for example, two waveguides or waveguide layers in close proximity to each other and can perform optical switching with small changes in the coupling coefficient. Further, the portion causing the changes in the index of refraction may be constituted by a polymer given a nonlinear optical effect by an electric field orientation treatment (for example, an epoxy polymer bonded with a diacetylene compound (Extended Abstracts (The 52nd Autumn Neeting, 1991); The Japan Society of Applied Physics, 11a-T-1.) It should be noted that in the actual structure, electrodes are provided for applying voltage for causing the electric field orientation treatment and the changes in the index of refraction, but these may be provided as a pair of parallel electrodes on one substrate or may be provided as counter electrodes on a substrate and the waveguide layer.

The multilayer waveguide directional coupler according to the present invention may be produced by forming the intermediate cladding layer by vapor deposition of a dielectric or a wet process, forming a dielectric at the coupling regions to exactly the necessary thickness by vapor deposition or a wet process without a mask, then placing a mask opened at the noncoupling region in close contact with the vapor deposition surface and further vapor depositing a dielectric so as to change the thickness of the intermediate cladding layer at the coupling region and noncoupling region or else by forming the intermediate cladding layer by vapor deposition of a dielectric, then placing a mask opened at the coupling region in close contact with the vapor deposition surface and vapor depositing a high refraction index dielectric to exactly the necessary thickness and placing a mask opened at the noncoupling region in close contact with the vapor deposition surface and vapor depositing a low refraction index dielectric to exactly the same thickness so as to change the index of refraction of the intermediate cladding layer at the coupling region and noncoupling region.

According to the present invention, it is possible to fabricate a directional coupler by forming the intermediate cladding layer by vapor deposition of a dielectric or a wet process, vapor depositing or spin coating a dielectric to exactly the necessary thickness in the coupling region without a mask, then placing a mask opened at the noncoupling region parallel to the vapor deposition surface away from that vapor deposition surface and further vapor depositing a dielectric, thereby successively changing the thickness of the intermediate cladding layer in the coupling region and noncoupling region. It should be noted that it is possible to use a mask opened at the noncoupling region to vapor deposit the dielectric, then form the dielectric by vapor deposition or the wet process without a mask or alternatively to reverse the order of the same. In the above method, it is also possible to coat a resist on the coupling regions, then form a dielectric on the entire surface by vapor deposition or a wet process, remove the resist to open the coupling portion, then further form a dielectric on the entire surface by vapor deposition or a wet process or it is possible to form a dielectric on the entire surface, then coat a resist on the noncoupling region, and etch the coupling region so as to change the thickness at the coupling portion and the noncoupling portion or to form a dielectric on the entire surface, then cover the noncoupling region with a mask and dry etch the coupling portion so as to change the thickness at the coupling region and noncoupling region. As the vapor deposited dielectric, use may be made of a transparent inorganic substance such as, for example, silicon oxide ($SiO_2$), silicon monoxide (SiO), aluminum oxide ($Al_2O_3$), tungsten oxide ($WO_3$), calcium fluoride ($CaF_2$), or a vapor deposited polymerized film of an organic substance (such as, for example, a polyimide, polyamide, polyurea, polyazomethine, epoxy polymer, but use may be made of a polymer nonlinear optical material of the present invention).

According to the present invention, a mask opened at the noncoupling region is used to vapor deposit a low refraction index dielectric, then a mask opened at the coupling region is used to vapor deposit a high refraction index dielectric. This order may also be reversed. Alternatively, a mask opened at the noncoupling region may used to vapor deposit a low refraction index dielectric, then a high refraction index dielectric may be vapor deposited or formed by spin coating or dip coating without a mask. Further, a resist may be coated on the coupling region, then a low refraction index dielectric may be vapor deposited or formed by spin coating or dip coating on the entire surface, the resist may be removed to open up the coupling region, then a high refraction index dielectric may be vapor deposited or formed by spin coating or dip coating. It should be noted that it is possible to prepare a directional coupler designed to change the index of refraction of the intermediate layer in the coupling region and noncoupling region by making the intermediate cladding layer a dielectric including photosensitive molecules, forming it to the necessary thickness on the coupling region and noncoupling region as a whole, then irradiating light through a mask opened at the noncoupling region so as to cause a reduction of the index of refraction by the photo reaction of the photosensitive molecules in the noncoupling region. In this case, it is also possible to fabricate a directional coupler designed to change the index of refraction of the intermediate cladding layer in the coupling region and the noncoupling region by making the intermediate cladding layer a dielectric, including photosensitive molecules, forming this on the coupling region and non coupling region as a whole to the necessary thickness, then irradiating light through a mask opened at the coupling region, thereby causing the index of refraction to increase by the photo reaction of the photosensitive molecules in the coupling region. As the dielectric, it is possible to use the above-mentioned inorganic substance. For the intermediate cladding layer, use may suitably be made of the above-mentioned polymer nonlinear material of the present invention.

According to the present invention, provision is made of a specific polymer nonlinear material superior in both the nonlinear optical effect and heat resistance. Further, according to the present invention, by making the thickness of the intermediate cladding layer small or by making the index of refraction of the intermediate cladding layer large, it is possible to set the desired coupling length even in a multi-layer type directional coupler.

EXAMPLES

The present invention will now be further illustrated by, but is by no means limited to, the following Examples.

Example 1

Figure 3:
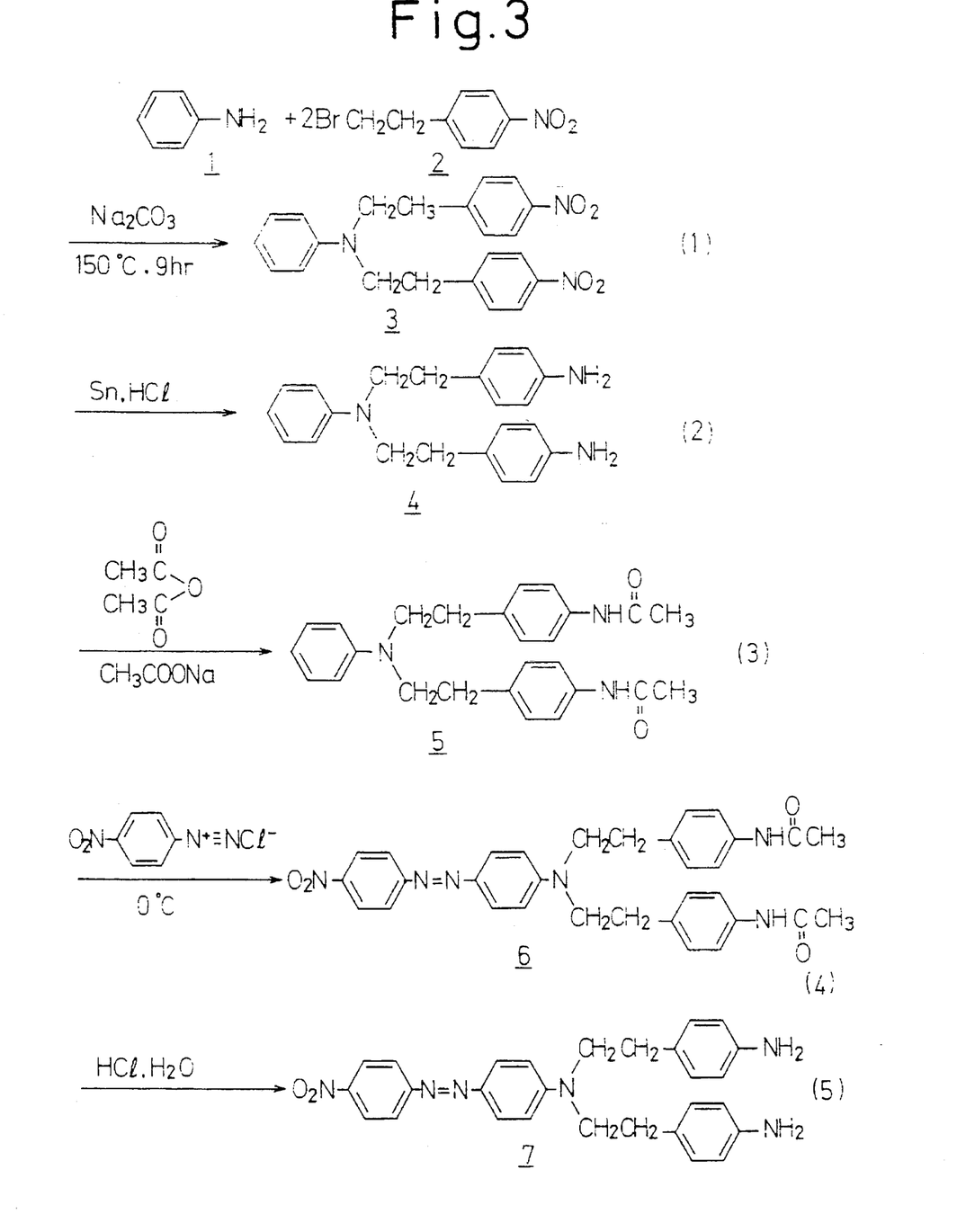
FIG. 3 is a view showing the method of synthesis of the material diamine in Example 1.
Figure 4:
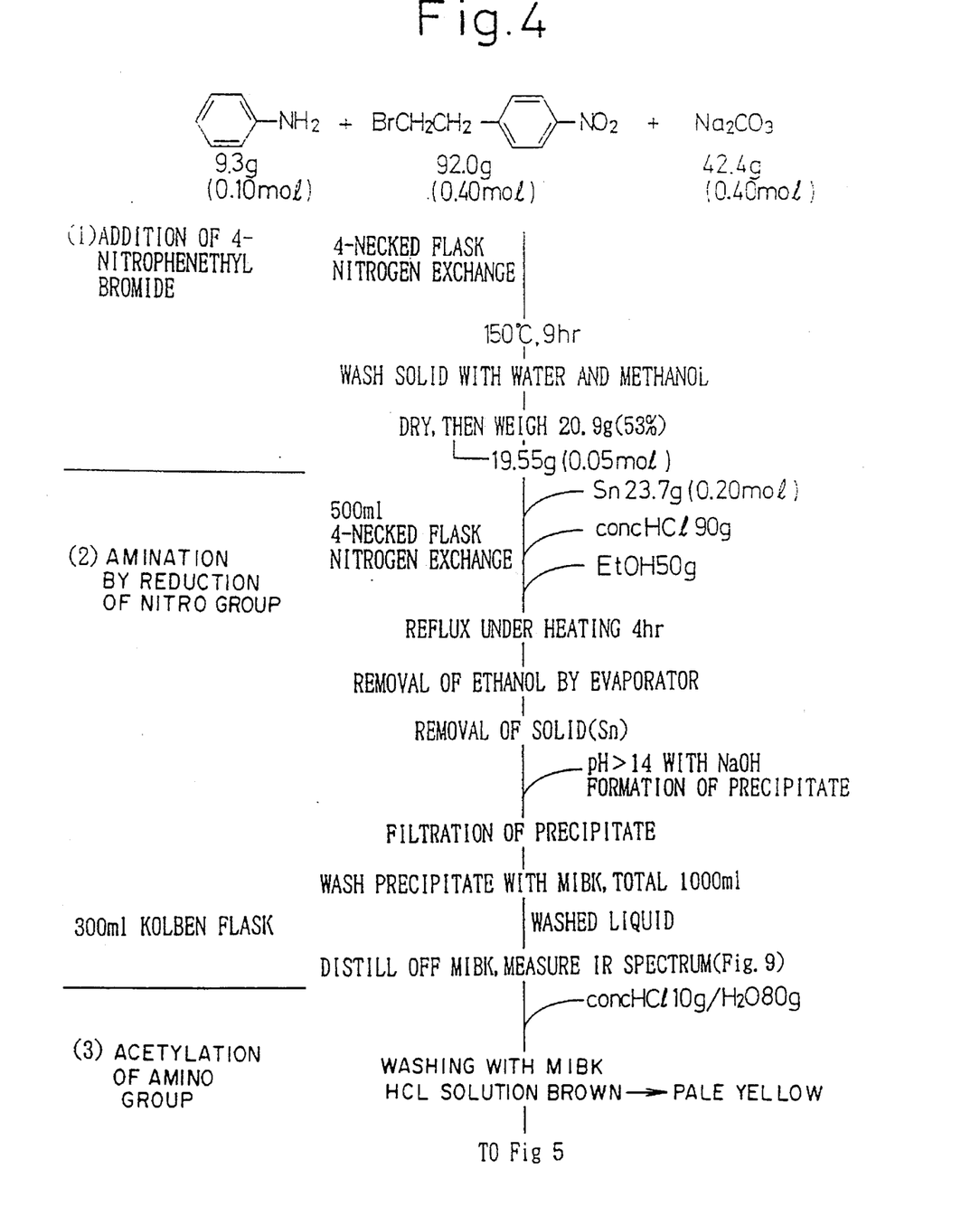
FIG. 4 is a view showing specifically the method of synthesis (i.e., the first half) of the material diamine of Example 1.
Figure 5:
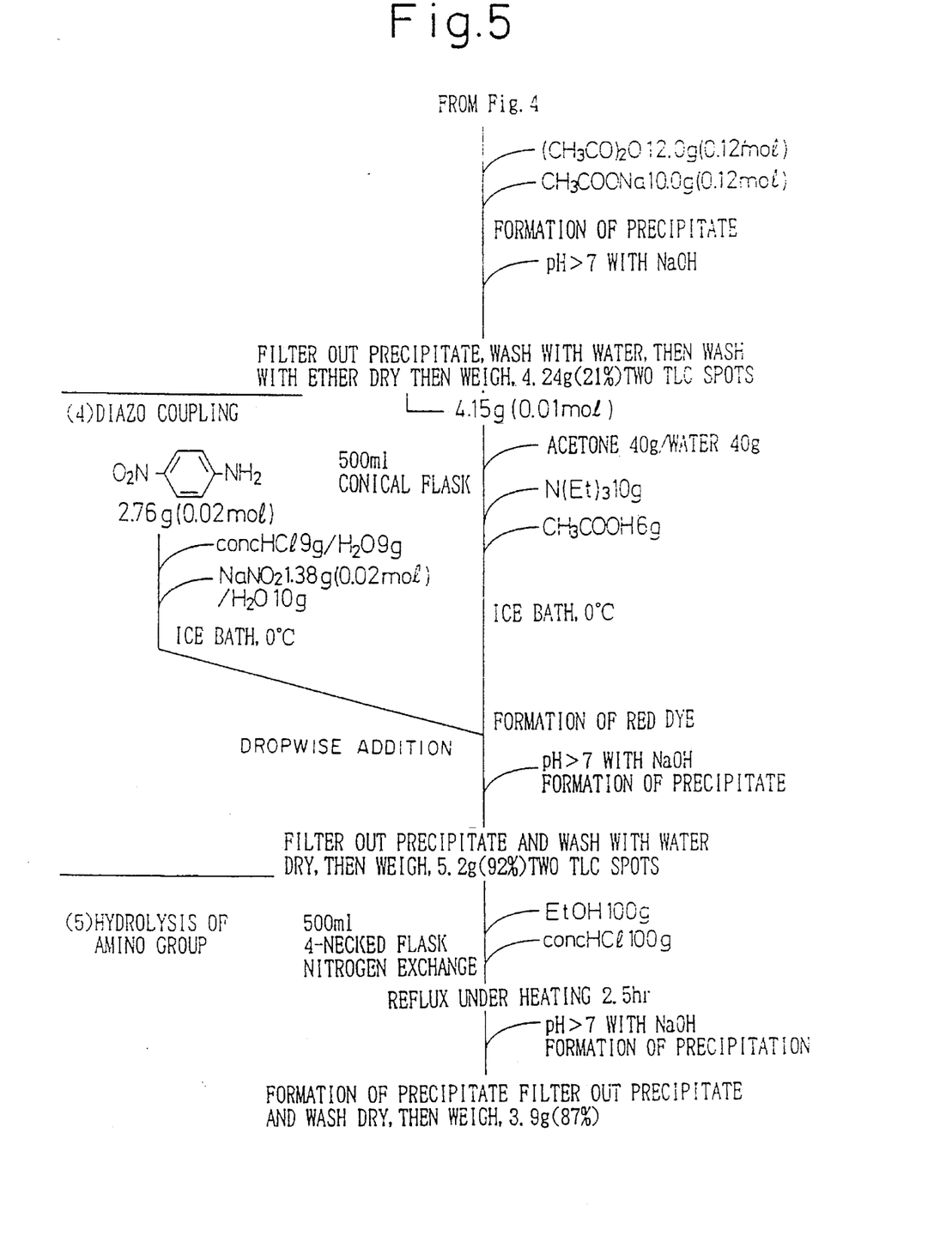
FIG. 5 is a view showing specifically the method of synthesis (i.e., the second half) of the material diamine of Example 1.
Figure 6:
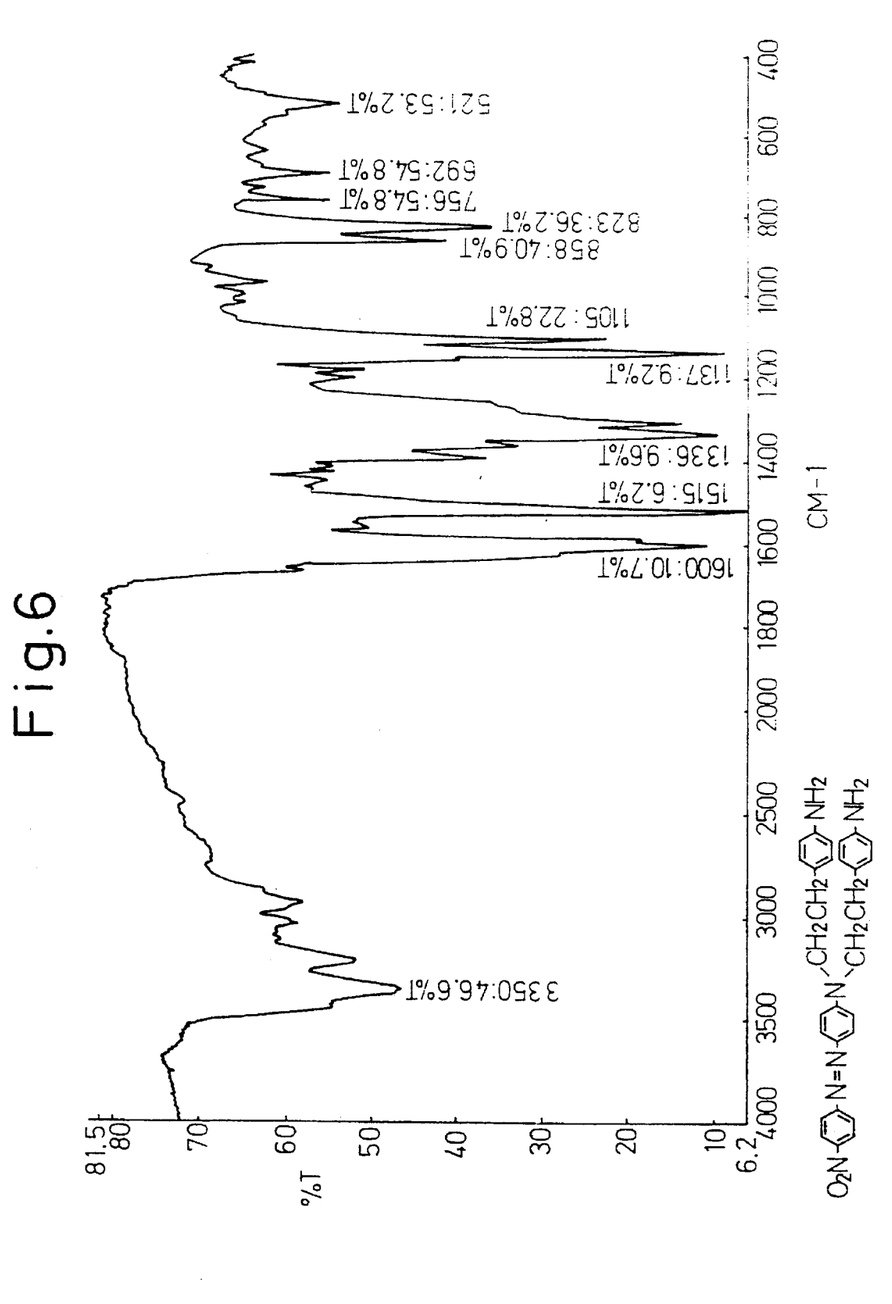
FIG. 6 is an IR spectrum diagram of the diamine synthesized in Example 1.

N,N-bis(4-aminophenyl)-4-(4-nitrophenylazo)aniline having a nonlinear optical effect of the formula (X):

was synthesized by the route and procedure shown in FIGS. 3, 4, and 5. The IR spectrum of the resultant diamine is shown in FIG. 6.

Figure 7:
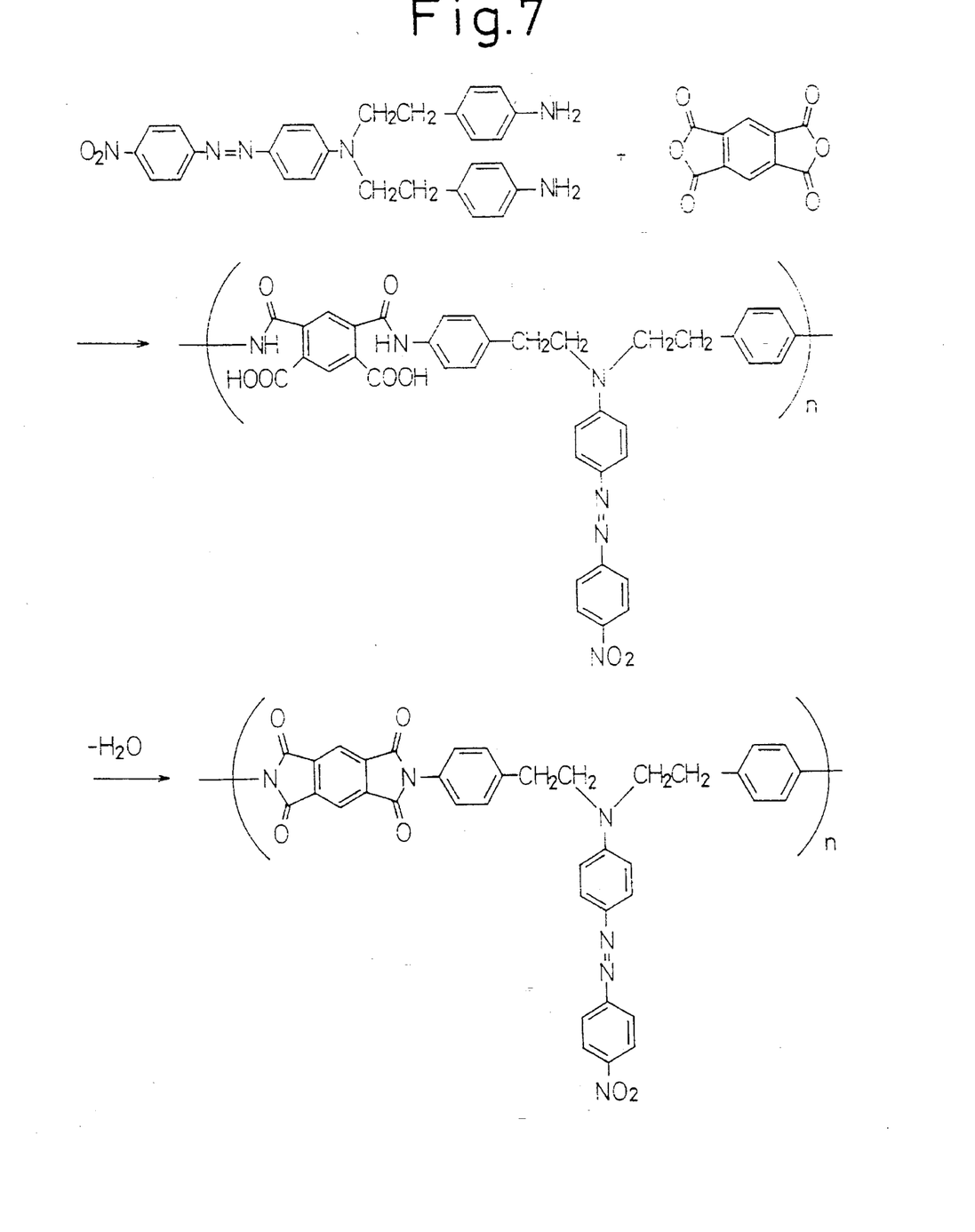
FIG. 7 is a view showing the routine of synthesis of the polyimide of Example 1.

Next, a polyimide was synthesized by the route shown in FIG. 7 from the diamine compound of the formula (X) obtained above and the compound of the formula (XI):

A 0.148 g (0.00031 mol) amount of the compound (X) and 0.067 g (0.00031 mol) of the compound (XI) were dissolved in 1.5 g of N,N-dimethylacetoamide and agitated at room temperature for 6 hours. After this, the resultant mixture was charged into methanol to cause precipitation. This was filtered out and dried to obtain the polyamic acid. A 15 wt % N,N-dimethylacetoamide solution of this polyamic acid was spin-coated at 1000 rpm and 30 s on a glass substrate with transparent ITO electrodes to form a film. This substrate was subjected to corona charging (Note: wire voltage of 6 kV and wire-substrate distance of 10 mm) and at the same time raised from room temperature to 230° C. at 4° C./min, then was heated at 230° C. for 1 hour and lowered to room temperature at a rate of 4° C./min to cause orientation of the molecules and polyimidization. Gold electrodes were vapor deposited on this film, then the electro-optic coefficient (r) was measured by the reflection method (C. C. Teng and H. T. Man, Appl. Phys. Lett. 56, 1734 (1990)), wherein $r_{33}=6$ pm/V was obtained. The sample was heated and the change in r over time was measured, whereupon it was learned that a nonlinear optical material with a high heat resistance was obtained with no reduction seen in the $r_{33}$ even after heat treatment at 150° C. for 3 hours.

Example 2

A xylene solution (30 wt %) of formula (XII)

was spin-coated at 1500 rpm and 30 s on a glass substrate with transparent ITO electrodes to form a film. The substrate was subjected to corona charging (Note: wire voltage of 6 kV and wire-substrate distance of 10 mm) and at the same time raised from room temperature to 230° C. at a rate of 4° C./min, then was heated at 230° C. for 1 hour to cause polymerization, then was lowered to room temperature at a rate of 4° C./min to cause orientation of the molecules. Gold electrodes were vapor deposited on this film, then the electro-optic coefficient (r) was measured by the reflection method, wherein r=3 pm/V was obtained. The sample was heated at 100° C. for 1 hour and the change in r over time was measured, whereupon it was learned that a nonlinear optical material with a high heat resistance was obtained with almost no reduction seen in the r.

Example 3

Figure 8A:
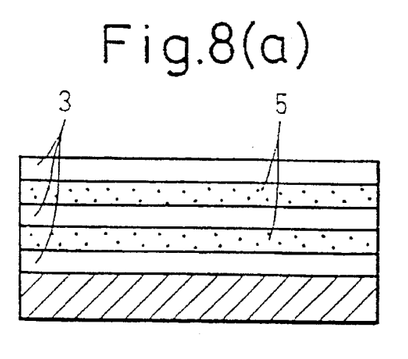
FIG. 8 is a view showing the structure of a multilayer waveguide of Example 3.
Figure 8B:
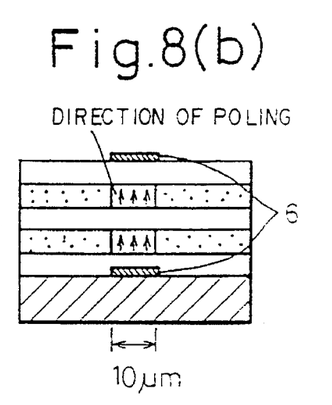
Figure 8C:
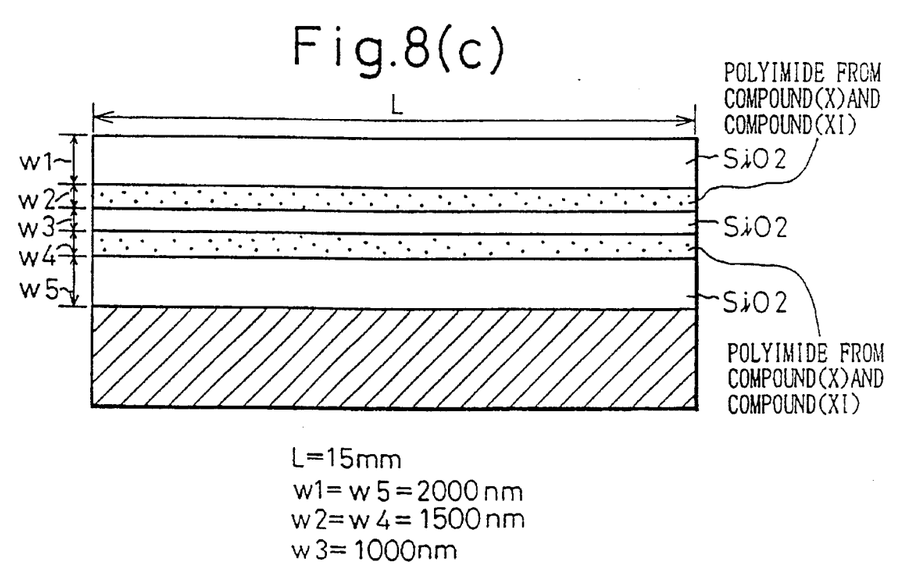
Figure 9:
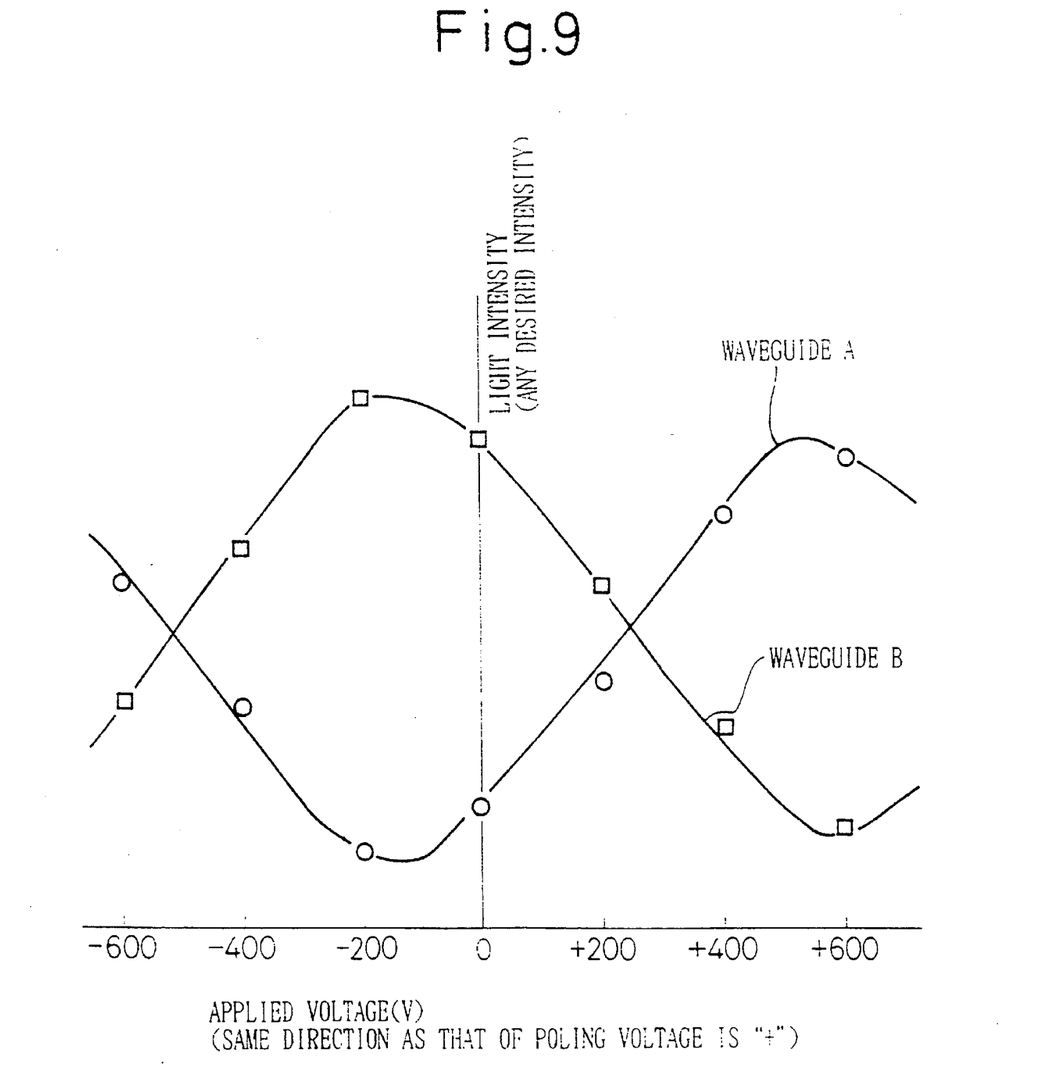
FIG. 9 is a graph showing the relationship between the applied voltage and intensity of the emitted light in a multilayer waveguide of the structure shown in FIG. 8 of Example 3.

$SiO_2$ was EB vapor deposited to 2 μm on a heat oxidized silicon substrate having Al linear electrodes (width of 10 μm). On the top thereof, polyamic acid obtained by the reaction between the compound (X) and the compound (XI) was spin-coated and the polyimide coating having a thickness of 1.5 μm was applied by heating at 250° C. for 2 hours. Further, a multilayer waveguide of the structure shown in FIG. 8 was prepared by EB vapor deposition of $SiO_2$, application of the polyimide coating, and fabrication of Al electrodes. Next, poling (100 MV/m, 250° C. 1 hr) was performed to impart, to the polyimide coating, an electro-optic effect characteristic and a channel type waveguide was formed by changing the index of refraction by the molecular orientation. The Si substrate was cleaved to take out a 15 mm channel type waveguide portion. Polarized semiconductor laser light (1.3 μm) perpendicular to the film surface was fired to the waveguide of one end. At this time, when a voltage is applied to the electrodes, the intensity of the light emitted from the two waveguides changes as shown in FIG. 9. In this way, optical switching by application of an electric field was performed in the multilayer type directional coupler. Further, after the above sample was heat treated at 150° C. for 2 hours, the above-mentioned optical switching test was repeated. As a result, the same result as shown in FIG. 9 was obtained. Thus, the heat resistance in the electro-optic effect of the polyimide was clearly exhibited.

Example 4

Figure 10:
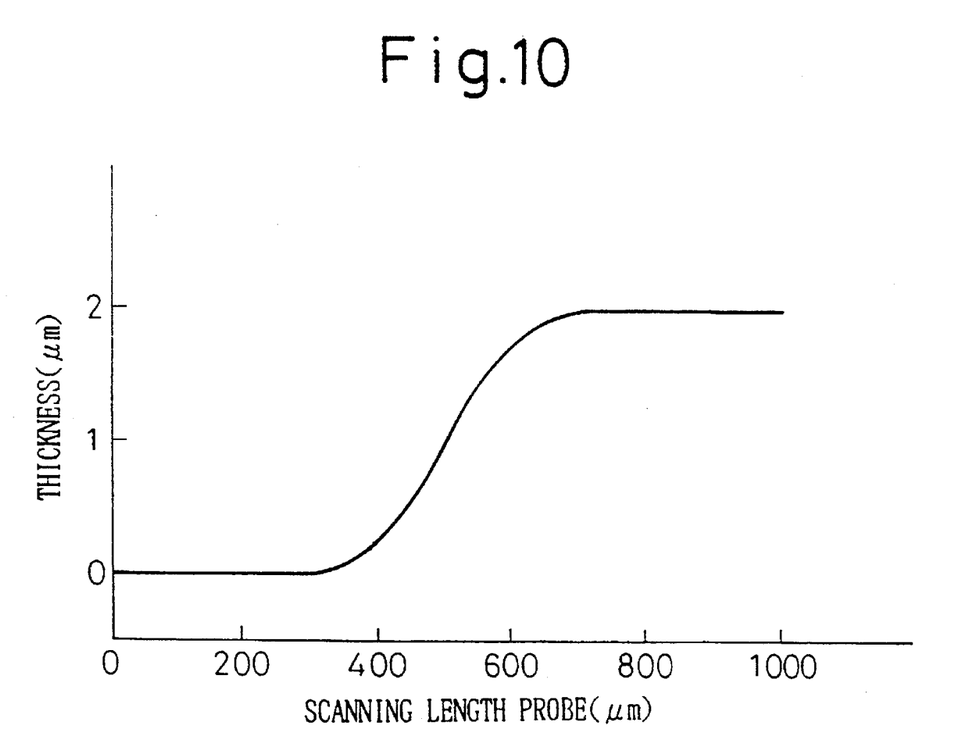
FIG. 10 is a graph showing the state of change of thickness on a substrate in Example 5.

A film of polyimide having a thickness of 1.5 μm was applied to the Si wafer with the heat oxidized film as a core layer by the spin-coating of polyamic acid obtained by the reaction between the compound (X) and the compound (XI) was spin-coated and by heating at 250° C. for 2 hours, then a mask with just the coupling portion of the directional coupler opened was placed a distance of 1 mm from the wafer, $SiO_2$ was EB vapor deposited, then an $SiO_2$ film was EB deposited to 1 μm without a mask. The state of the change of the thickness at this time was measured by a steps, whereupon the result shown in FIG. 10 was obtained. On the top thereof, the same polyimide film as the lower layer was coated at a thickness of 1.5 μm, then a $SiO_2$ film was vapor deposited as an upper buffer layer, whereupon a multilayer type directional coupler with a controlled coupling length was obtained.

Example 5

A film of polyimide having a thickness of 1.5 μm was applied to the Si wafer with the heat oxidized film as a core layer by the spin-coating of polyamic acid obtained by the reaction between the compound (X) and the compound (XI) was spin-coated and by heating at 250° C. for 2 hours, then a mask with just the coupling portion of the directional coupler closed was placed into close contact on the wafer, $SiO_2$ (n=1.48) was EB vapor deposited to 1 μm, then a mask with only the coupling portion of the directional coupler opened was placed into close contact, and $Al_2O_3$ (n=1.63) was EB vapor deposited to 1 μm. On the top thereof, the same polyimide film as the lower layer was coated at a thickness of 1.5 μm, then a $SiO_2$ film was vapor deposited as an upper buffer layer, whereupon a multilayer type directional coupler where the coupling length was controlled so that the two core layers were coupled in the $Al_2O_3$ cladding portion where the index of refraction was large and were not coupled in the $SiO_2$ cladding portion where the index of refraction was large was obtained.

As explained above, according to the present invention, provision is made of a polymeric nonlinear optical material superior in both the nonlinear optical effect and heat resistance. Further, since the indexes of refraction of the core portions or cladding portions of two directly connected waveguides are changed to change the coupling constant between waveguides, optical switching can be effectively carried out. Further, in a multilayer type waveguide, by changing the thickness or index of refraction of the intermediate cladding layer between the noncoupling region and the coupling region, a directional coupler is constituted between two waveguides, and therefore, it is possible to obtain a directional coupler suitable for use in a multilayer type waveguide.

What is claimed is:

1. A polymer nonlinear optical material having the formula (IV):

wherein, Z is a portion having a nonlinear optical effect and $n_4$ is an integer of 2 or more.

2. A nonlinear optical material as claimed in claim 1, wherein the portion Z having the nonlinear optical effect in formula (IV) is a residual group having a bond at at least one benzene ring selected from the group consisting of the azobenzene structure of formula (V), the stilbene structure of formula (VI), the tolan structure of formula (VII), and the diacetylene structure of formula (VIII)

wherein D is a donor group and A is an acceptor group.

3. A material as claimed in claim 1, wherein the said donor group D is —$NR^1R^2$ wherein $R^1$ and $R^2$ are, independently, a hydrogen atom or a straight chain or branched chain alkyl group having 1 to 4 carbon atoms and said acceptor group A is a —$NO_2$, —CN, or a dicyanovinyl group.

4. A nonlinear optical material as claimed in claim 1, wherein said nonlinear optical material is formed by ring-opening polymerization of a monomer molecule having a benzocyclobutene structure.

* * * * *